US009882793B2

(12) United States Patent
Broda et al.

(10) Patent No.: US 9,882,793 B2
(45) Date of Patent: *Jan. 30, 2018

(54) ACTIVE WATERFALL CHARTS FOR CONTINUOUS, REAL-TIME VISUALIZATION OF WEBSITE PERFORMANCE DATA

(71) Applicant: SOASTA, Inc., Mountain View, CA (US)

(72) Inventors: Tal Broda, Sunnyvale, CA (US); Darrell Esau, Santa Clara, CA (US); Michael Hemmert, Scotts Valley, CA (US)

(73) Assignee: SOASTA, Inc., Mountain View, CA (US)

( * ) Notice: Subject to any disclaimer, the term of this patent is extended or adjusted under 35 U.S.C. 154(b) by 205 days.

This patent is subject to a terminal disclaimer.

(21) Appl. No.: 14/986,879

(22) Filed: Jan. 4, 2016

(65) Prior Publication Data

US 2016/0182321 A1    Jun. 23, 2016

Related U.S. Application Data

(63) Continuation of application No. 13/492,249, filed on Jun. 8, 2012, now Pat. No. 9,229,842, which is a (Continued)

(51) Int. Cl.
G06F 17/00 (2006.01)
H04L 12/26 (2006.01)
(Continued)

(52) U.S. Cl.
CPC .......... *H04L 43/045* (2013.01); *G06F 3/0481* (2013.01); *G06F 3/0484* (2013.01); (Continued)

(58) Field of Classification Search
CPC ... H04L 69/16; H04L 61/1511; H04L 43/045; H04L 41/22; G06T 11/206; G06F 3/0484; (Continued)

(56) References Cited

U.S. PATENT DOCUMENTS 6,317,786 B1   11/2001   Yamane et al.
6,477,483 B1   11/2002   Scarlat et al.
(Continued)

OTHER PUBLICATIONS

Dillenseger, "CLIF, a framework based on Fractal for flexible, distributed load testing" Nov. 18, 2008, Ann. Telecommun., 64:101-120.

*Primary Examiner* — Scott Baderman
*Assistant Examiner* — Matthew G McVicker
(74) *Attorney, Agent, or Firm* — The Law Offices of Bradley J. Bereznak

(57) ABSTRACT

A processor-implemented method includes providing an analytic dashboard with a graphical user interface (GUI) that outputs aggregated results streaming in real-time of a load test performed on a target website. The load test consists of a plurality of virtual users simulated by one or more load servers that execute a test composition on one or more webpages of the website. A waterfall chart is produced on the analytic dashboard that includes a plurality of timeline bars. Each of the timeline bars represents an aggregated result for a resource of the one or more webpages across all of the virtual users. The timeline bars change in real-time as the load test progresses.

9 Claims, 9 Drawing Sheets

Related U.S. Application Data continuation-in-part of application No. 12/804,338, filed on Jul. 19, 2010, now Pat. No. 9,436,579.

(51) Int. Cl.

| | | |
|---|---|---|
| *G06F 11/34* | (2006.01) | |
| *G06F 3/0481* | (2013.01) | |
| *G06F 3/0484* | (2013.01) | |
| *G06T 11/20* | (2006.01) | |
| *H04L 12/24* | (2006.01) | |
| *H04L 29/12* | (2006.01) | |
| *H04L 29/06* | (2006.01) | |

(52) U.S. Cl.
CPC ...... *G06F 11/3414* (2013.01); *G06F 11/3428* (2013.01); *G06F 11/3495* (2013.01); *G06T 11/206* (2013.01); *H04L 41/22* (2013.01); *H04L 61/1511* (2013.01); *H04L 69/16* (2013.01); *G06F 2201/875* (2013.01)

(58) Field of Classification Search
CPC ............... G06F 3/0481; G06F 11/3494; G06F 11/3414; G06F 2201/875; G06F 11/3428
See application file for complete search history.

(56) References Cited

U.S. PATENT DOCUMENTS

| | | | |
|---|---|---|---|
| 6,542,163 | B2 | 4/2003 | Gorbet et al. |
| 6,560,564 | B2 | 5/2003 | Scarlat et al. |
| 6,738,933 | B2 | 5/2004 | Fraenkel et al. |
| 6,792,393 | B1 | 9/2004 | Farel et al. |
| 6,898,556 | B2 | 5/2005 | Smocha et al. |
| 7,133,805 | B1 | 11/2006 | Dankenbring et al. |
| 7,334,162 | B1 | 2/2008 | Vakrat et al. |
| 7,548,875 | B2 | 6/2009 | Mikkelsen et al. |
| 7,617,201 | B1 | 11/2009 | Bedell et al. |
| 7,685,234 | B2 | 3/2010 | Gottfried |
| 7,725,812 | B1 | 5/2010 | Balkus et al. |
| 7,743,128 | B2 | 6/2010 | Mullarkey |
| 7,757,175 | B2 | 7/2010 | Miller |
| 7,844,036 | B2 | 11/2010 | Gardner et al. |
| 8,015,327 | B1 | 9/2011 | Zahavi et al. |
| 8,166,458 | B2 | 4/2012 | Li et al. |
| 8,306,195 | B2 | 11/2012 | Gardner et al. |
| 8,341,462 | B2 | 12/2012 | Broda et al. |
| 8,510,600 | B2 | 8/2013 | Gardner et al. |
| 2002/0147937 | A1 | 10/2002 | Wolf |
| 2003/0074161 | A1 | 4/2003 | Smocha et al. |
| 2003/0074606 | A1 | 4/2003 | Boker |
| 2003/0109951 | A1 | 6/2003 | Hsiung et al. |
| 2004/0039550 | A1 | 2/2004 | Myers |
| 2004/0059544 | A1 | 3/2004 | Smocha et al. |
| 2004/0123320 | A1 | 6/2004 | Daily et al. |
| 2004/0205724 | A1 | 10/2004 | Mayberry |
| 2005/0102318 | A1 | 5/2005 | Odhner et al. |
| 2005/0216234 | A1 | 9/2005 | Glas et al. |
| 2005/0278458 | A1 | 12/2005 | Berger et al. |
| 2006/0271700 | A1 | 11/2006 | Kawai et al. |
| 2007/0232237 | A1 | 10/2007 | Croak et al. |
| 2008/0059947 | A1 | 3/2008 | Anand et al. |
| 2008/0140347 | A1 | 6/2008 | Ramsey et al. |
| 2008/0189408 | A1 | 8/2008 | Cancel et al. |
| 2009/0271152 | A1 | 10/2009 | Barrett |
| 2010/0023867 | A1 | 1/2010 | Coldiron et al. |
| 2010/0057935 | A1 | 3/2010 | Kawai et al. |
| 2010/0115496 | A1 | 5/2010 | Amichai |
| 2010/0250732 | A1 | 9/2010 | Bucknell |
| 2011/0066892 | A1 | 3/2011 | Gardner et al. |
| 2011/0119370 | A1 | 5/2011 | Huang et al. |
| 2011/0130205 | A1 | 6/2011 | Cho et al. |
| 2011/0202517 | A1 | 8/2011 | Reddy et al. |
| 2012/0017165 | A1 | 1/2012 | Gardner et al. |
| 2012/0017210 | A1 | 1/2012 | Huggins et al. |
| 2012/0023429 | A1 | 1/2012 | Medhi |
| 2012/0101799 | A1 | 4/2012 | Fernandes |
| 2012/0166634 | A1 | 6/2012 | Baumback et al. |
| 2012/0246310 | A1 | 9/2012 | Broda et al. |
| 2013/0097307 | A1 | 4/2013 | Vazac et al. |
| 2013/0116976 | A1 | 5/2013 | Kanemasa et al. |
| 2014/0033055 | A1 | 1/2014 | Gardner et al. |
| 2014/0189320 | A1 | 7/2014 | Kuo |
| 2014/0280880 | A1 | 9/2014 | Tellis et al. |
| 2015/0067527 | A1 | 3/2015 | Gardner et al. |

FIG. 7

ACTIVE WATERFALL CHARTS FOR CONTINUOUS, REAL-TIME VISUALIZATION OF WEBSITE PERFORMANCE DATA

RELATED APPLICATIONS

This application is a continuation of Ser. No. 13/492,249 filed Jun. 8, 2012, now U.S. Pat. No. 9,229,842 which is a continuation-in-part (CIP) application of Ser. No. 12/804,338 filed Jul. 19, 2010, now U.S. Pat. No. 9,436,579, entitled, "REAL-TIME, MULTI-TIER, LOAD TEST RESULTS AGGREGATION", which is assigned to the assignee of the present application.

TECHNICAL FIELD

The present disclosure relates generally to methods and apparatus for processing data generated from load testing of websites or browser-based applications. Still more particularly, the present disclosure relates to methods, apparatus and executable computer instructions for generating waterfall charts as a performance analysis tool.

BACKGROUND

In recent years, enterprises and developers have sought an easy and affordable way to use cloud computing as a way to load and performance test their websites and web-based applications. Cloud computing gets its name from the fact that the machine, storage, and application resources exist on a "cloud" of servers. In cloud computing shared resources, software and information are provided on-demand, like a public utility, via the Internet. Cloud computing is closely related to grid computing, which refers to the concept of interconnecting networked computers such that processing power, memory and data storage are all community resources that authorized users can utilize for specific tasks.

A web site is simply collection of files on a remote server. When a user accesses a website via a browser, Hypertext Transfer Protocol (HTTP) or HTTP Secure (HTTPS) message intercommunications take place with the target website. In very simple terms, when a user wishes to view a webpage, HTTP requests each of the various files or objects that make up the webpage. These objects may include text, images, JavaScript files, etc. Each of these objects is typically delivered from the host server to the user's browser in a serial manner. That is, a series of communicative actions needs to occur between the browser and server in order for the user to view a specific page of a website. Essentially, the files and objects which comprise the webpage are loaded one-by-one. Due to the request-and-response nature of HTTP, there is a latency associated with each file that is loaded.

Load testing a web-based application or website can involve simulating a very large number (e.g., up to or beyond 1,000,000) of virtual website users via HTTP or HI IP Secure (HTTPS) message intercommunications with a target website. For very large tests, sending and aggregating the test results data generated from all of the load servers to a database available to a dashboard in real-time has been problematic. The huge overhead of receiving and processing a very large number of HTTP messages containing all of the requests and responses sent from each of the many load servers to the analytic servers responsible for analyzing the test results data can easily overwhelm the resources of the server, In addition, communications bottlenecks can occur wherein messages get queued up in long stacks or lines, such that the test results are no longer sent to the database in real-time, and therefore are not available in the dashboards in real-time. In extreme cases, the load test servers can also back up, causing them to not generate the appropriate load on the customers' websites or web applications.

A waterfall chart is another visual tool that developers and businesses use to analyze webpage performance. Waterfall charts are diagrams that allow a user to visualize data that is generated cumulatively and sequentially across the process of loading a webpage. A waterfall chart for a website provides the user with a visual representation of all of the series of actions that occur between a user's browser and the website server when that user wishes to view a specific page of the website. A typical waterfall chart consists of a series of colored bars that extend horizontally across a timeline. Each of the colored bars represents a different activity that happens as the associated object is delivered to the user's browser. For example, a dark green bar may represent a Domain Name System (DNS) lookup wherein the browser looks up the domain of the object being requested. An orange bar may represent a Transmission Control Protocol (TCP) connection process by which the browser and server send and receive acknowledgement that a connection has been made. A bright green bar may represent the so-called "time to first byte"; the window of time between when the browser asks the server for content until the first byte of content is received back. A blue bar may be used in a waterfall chart to indicate the time it takes for the entire content to be sent from the server to the browser.

One problem with existing waterfall charts is that they are entirely static, meaning that once the webpage is fully loaded the timeline information shown by the various colored bars is static on a per user basis, i.e., it does not change. A more useful metric to a developer or website owner would be an active waterfall chart that aggregates and updates website/webpage performance on a continuous, real-time basis across a changing number of virtual users and/or multiple webpages associated with a target website.

BRIEF DESCRIPTION OF THE DRAWINGS

The present disclosure will be understood more fully from the detailed description that follows and from the accompanying drawings, which however, should not be taken to limit the invention to the specific embodiments shown, but are for explanation and understanding only.

FIG. 7 is an example graphical user interface window that illustrates an active waterfall chart showing aggregated results for a plurality of virtual users at a second point in time during execution of a load test.

DETAILED DESCRIPTION

Figure 1:
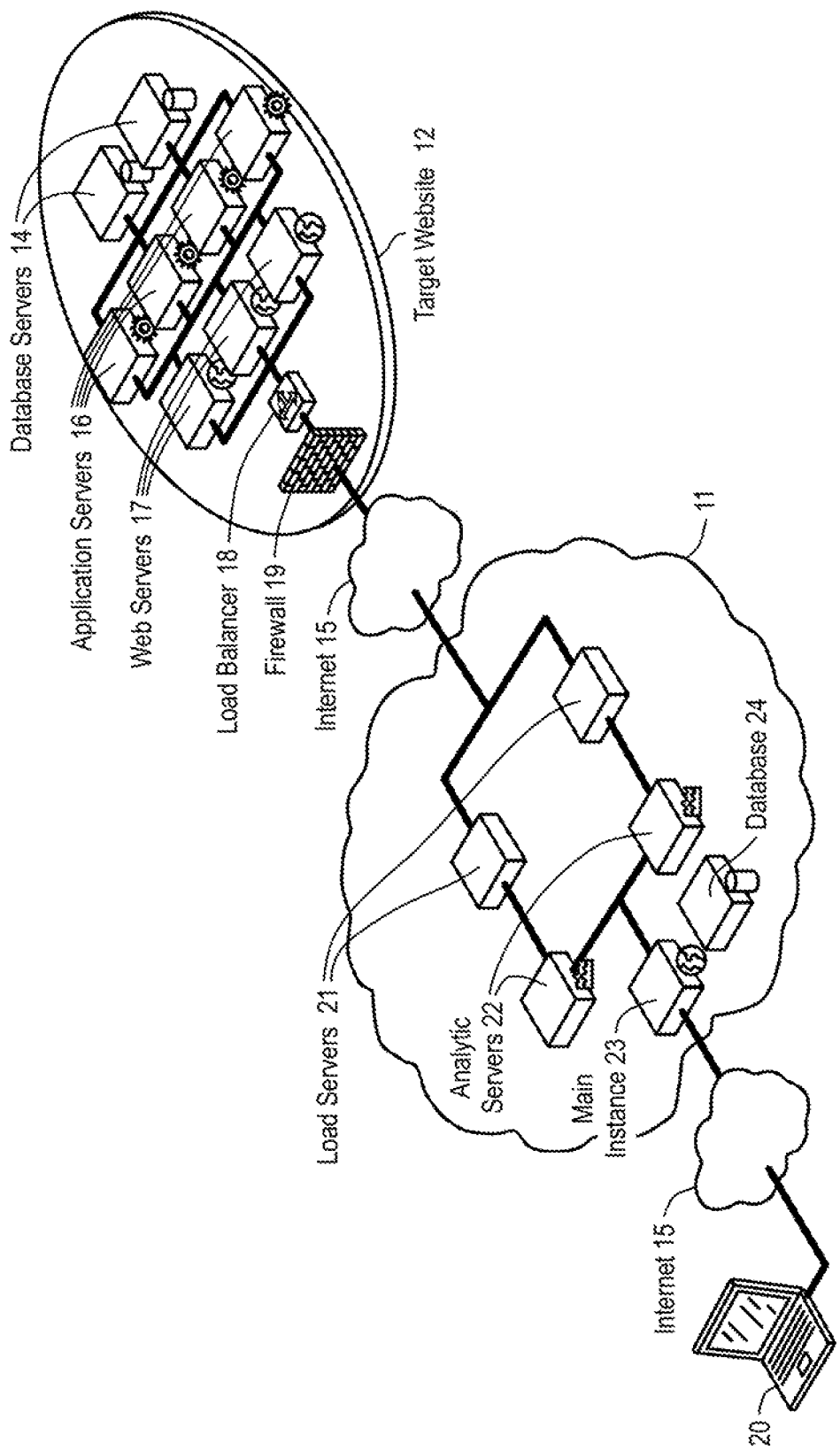
FIG. 1 illustrates an example high level architectural diagram of one stage of a CloudTest® provisioning process.

In the following description specific details are set forth, such as server types, cloud providers, structural features, process steps, visual objects, charts, etc., in order to provide a thorough understanding of the subject matter disclosed herein. However, persons having ordinary skill in the relevant arts will appreciate that these specific details may not be needed to practice the present invention. It should also be understood that the elements in the FIG.s are representational, and are not drawn to scale in the interest of clarity.

References throughout this description to "one embodiment", "an embodiment", "one example" or "an example" means that a particular feature, structure or characteristic described in connection with the embodiment or example is included in at least one embodiment. The phrases "in one embodiment", "in an embodiment", "one example" or "an example" in various places throughout this description are not necessarily all referring to the same embodiment or example. Furthermore, the particular features, structures or characteristics may be combined in any suitable combinations and/or sub-combinations in one or more embodiments or examples.

In the context of the present, application, the term "cloud" broadly refers to a collection of machine instances, storage and/or network devices that work together in concert. A "public cloud" refers to a cloud that is publically available, i.e., provided by a cloud provider that a user may access via the Internet in order to allocate cloud resources for the purpose of utilizing or deploying software programs, and also for running or executing those programs thereon. Some public clouds deliver cloud infrastructure services or Infrastructure as a Service (IaaS). By way of example, Amazon Elastic Compute Cloud (also known as "EC2™") is a web service that allows users to rent computers on which to run their own computer applications, thereby allowing scalable deployment of applications through which a user can create a virtual machine (commonly known as an "instance") containing any software desired. The term "elastic" refers to the fact that user can create, launch, and terminate server instances as needed, paying by the hour for active servers.

Cloud platform services or "Platform as a Service (PaaS)" deliver a computing platform and/or solution stack as a service. An example PaaS cloud provider is the Google App Engine, which lets anyone build applications on Google's scalable infrastructure. Another leading software platform in the cloud provider is Microsoft Azure™, an application platform in the cloud that applications to be hosted and run at Microsoft datacenters.

A "private cloud" is a cloud that is not generally available to the public, and which is typically located behind a firewall of a business. Thus, a private cloud is only available as a platform for users of that business who are behind the firewall.

The term "server" broadly refers to any combination of hardware or software embodied in a computer (i.e., a machine "instance") designed to provide services to client devices or processes. A server therefore can refer to a computer that runs a server operating system from computer-executable code stored in a memory, and which is provided to the user as virtualized or non-virtualized server: it can also refer to any software or dedicated hardware capable of providing computing services.

A "message" generally refers to a unit of data that can be sent via an electronics communications network, e.g., the Internet, to another computational or communications system or device, e.g., to a server. By way of example, a message could represent a communication sent to a queuing system, a REST call, or a Hypertext Transfer Protocol (HTTP) request. A message could also be instantiated entirely or partially as a single operation, such as a web service call in any one of a variety of forms, e.g., XML, JMS, HTML, JSON, etc. A "message clip" (or "clip" for short) comprises a set of one or more messages that includes a specification of the location, timing and/or dependencies of objects or elements specified within that set of messages. A clip typically comprises a plurality (e.g., hundreds or thousands) of sequenced messages that form part of a larger load test composition.

In the context of, the present disclosure, "load" servers (also referred to as "Maestro" or "test" servers) are servers deployed and utilized primarily to generate a test load on a target website. That is, load servers play the test composition, generating a load on a target (customer) website and web applications. Load servers also function to report back results of the load test and statistics in real-time. "Analytic" or "result" servers are deployed and utilized primarily to collect the real-time test results from the load servers, aggregate those results, stream the results to real-time dashboards, and store them in a database.

The term "real-time" refers to a level of computer responsiveness that a user senses as sufficiently immediate or that enables the computer to keep up with some external process (for example, to present visualizations of load test results as it constantly changes). Thus, real-time is a mode of computer operation in which the computer collects data, analyzes or computes with the data, reports (e.g., visually displays) and/or stores the results nearly simultaneously, i.e. within seconds or milliseconds.

A "grid" or "test grid" refers to a collection of interconnected load servers and result servers that may be used to run a load test on a target website or web applications. As disclosed herein, a computer program or grid wizard may be utilized to automatically determine the global, cross-cloud, resources needed to execute a test by examining the test plan or script (also referred to as a test composition). Furthermore, the computer program can automatically allocate those server resources required for the test across multiple different cloud providers; verifies that the allocated servers are operational; and that the allocated servers are running proprietary load testing software or computer program product correctly. The computer program or product also monitors the allocated servers, replacing non-operational servers (when allocated, and during execution of the test) and displays results from multiple globally distributed clouds in a real-time streaming dashboard, which requires no user initiated refresh.

In the context of the present disclosure, a "Waterfall chart" refers to a diagram that allows a viewer to visualize data that is generated cumulatively and sequentially across a process. As they relate to website performance, waterfall charts are used to let someone see the series of actions that occur between a user and a server in order for that user to view a specific webpage ("page" for short) of a particular website. Each row of a waterfall chart for a website typically represents a different object, i.e., text, image, JavaScript files, etc., contained on a given page. For instance, an average webpage may typically include 40-80 different objects and files that need to be delivered from the remote server to the user's web browser.

In one embodiment, a method and system is provided for calculating load test aggregated test results at three architectural levels: first, at the load server level; second, at the analytics server level; and lastly at the system-wide datastore level. In a specific implementation, detailed level "raw" data (the content of a request sent to a website e.g., to access a homepage) is not sent from any of the load servers to any analytic server. Thus, system resources on the load server side are not wasted for the continual sending of raw data. Similarly, system resources on the analytics server side are conserved since the need to receive and process raw data sent from the load servers is obviated.

Instead of sending the raw data (web pages' responses and their statistics) obtained during a load test from each of the load servers to the analytic servers, a level of aggregation is added within each of the load servers, That is, in one embodiment, each load server includes an embedded component or client (referred to as a Results Service Client) that performs analytics server functions at the load server level. This Results Service Client aggregates test result data and generates various results statistics or metrics, e.g. average response time, average response size, average time to first byte, etc., from the raw data that the load server received from the target website or application. The statistics computed by the Results Service Client in each of the load servers are then sent to their associated analytic server at periodic intervals (e.g., once every five seconds).

In another embodiment, a user interface is provided that allows a user to display a waterfall chart on an analytic dashboard that aggregates and updates website/webpage performance on a continuous, real-time basis across a changing number of virtual users and/or multiple webpages associated with a target website.

FIG. 1 illustrates an example high level architectural diagram of one stage of a CloudTest® provisioning process, which is the name given to the application program or grid wizard program utilized to load test a target website 12. As shown, target website 12 includes a plurality of web servers 17 coupled to Internet cloud 15 through a load balancer 18 and a firewall 19. Web servers 17 are interconnected with a plurality of application servers 16 and a plurality of database servers 14.

Target website 12 is shown connected to a public cloud 11 via Internet cloud 15. Public cloud 11 includes a main instance 23 coupled to a database 24. Database 24 may be used to store test results, store metadata indicative of the test definition, and to store monitoring data (e.g., CPU metrics) generated during the load test. Main instance 23 is also shown coupled to a pair of analytic servers 22 and a pair of load servers 21 within cloud 11, consistent with a snapshot view of the start of a process of deploying a test grid. It is appreciated that cloud 11 may comprise multiple clouds associated with multiple different cloud providers. In the example shown, main instance 23 is a virtual machine deployed on a server provided in cloud 11 that communicates with a browser application. In one embodiment, main instance 23 may include a results service (designated as a "reader" results service, as opposed to all of the other remote, "writer" results services) which reads data from database 24 and serves it to a web application, which in turn formats the data and serves it to an analytic dashboard in the browser. In operation, main instance 23 executes the coded sequence of computer executed steps (e.g., from code stored a memory) that allocates the server resources required for the test across one or multiple different cloud providers. The same application that allocates f verifies server resources may also verify that the allocated servers are operational to conduct the website load test. The main instance may also execute code that implements the multi-tiered load test results aggregation steps disclosed herein.

Additionally, main instance 23 may also execute code that generates the GUI described herein that allows a user to generate a continuous (i.e., looping) waterfall chart in real-time on the screen for large number of virtual users.

Connected to the front-end of cloud 11 through Internet cloud 15 is a laptop computer 20 associated with a user who may orchestrate deployment of the test of target website 12. It is appreciated that in other implementations, computer 20 may comprise a desktop computer, workstation, or other computing device that provides a graphical user interface that allows a user to create and execute the test composition, define the parameters of the grid, initiate the load test, as well as analyze/review results of the test in real-time. This GUI also provides the ability to creating a continuous, real-time waterfall chart for visual display to the user. The GUI may be web-based so it can be accessed from any computer having web-browser capabilities from any location in the world, without installation of specialized software.

Persons of skill in the art will understand that the software which implements main instance 23 may also be downloaded to the user's laptop computer 20 or implemented on a separate hardware appliance unit located either at the user's premises (e.g., behind the firewall) or anywhere in clouds 15 or 11. It is appreciated that laptop 20 is representative of a wide variety of computer devices, such as workstations, personal computers, distributed computer systems, etc., that may be utilized by the user to launch the method for provisioning/running the cross-CloudTest grid, analyzing streaming real-time results, monitoring the performance of the actual load test, and generating one or more charts (e.g., waterfall) for visual display on an analytic dashboard. In other words, the GUI described herein may also run on a computer or data processing system local to the user.

The computers, servers, and computing devices described and referenced herein may comprise any of the computers, servers, or electronic processing devices for coupling or connection with a communications network. Such devices typically comprise a number of basic subsystems including a processor subsystem, a main memory and an input/output (I/O) subsystem, Data may be transferred between the main memory ("system memory") and the processor subsystem over a memory bus, and between the processor subsystem and I/O subsystem over a system bus. Computing devices may also comprise other hardware units/modules coupled to the system bus for performing additional data processing, algorithmic or communication functions, Alternatively, these functions may be performed by one or more processors of the processor subsystem which typically comprises one or more processors.

Continuing with the example of FIG. 1, the application program, running on main instance 23 operates to create a GUI that allows a user of laptop 20 to remotely interact with the application, view/monitor the test results in real-time, and modify parameters/test conditions dynamically during the actual test. (For purposes of the present disclosure, the grid wizard is considered synonymous with the application program or system program that performs the method and operations described herein.) In one embodiment, main instance 23 may include an embedded load server for running a relatively small load test that does, not require he deployment of other load servers, and an embedded results (i.e., analytic) server for collecting/aggregating the real-time test results. In another embodiment, the main instance and the database provide a basic CloudTest testing environment that can be used to launch/establish one or more grids, with one or more cloud, providers being utilized to provision each grid.

The overall testing process begins with the user creating a sophisticated test plan or composition via a GUI of either the same application program running on main instance 23 or a GUI associated with another web browser application. The GUI may be utilized that generate complex parallel message streams for website testing. In one example, the test plan may be created in the form of a visual message composition (analogous to a music composition) for testing and demonstrating web services, such as that described in U.S. patent application Ser. No. 11/503,580, filed Aug. 14, 2006, now U.S. Pat. No. 7,844,036, which is herein incorporated by reference.

The process of deploying the test grid for a large-scale test may start with the user of laptop 20 indicating to main instance 23 the number of virtual users wanted on each track of the test composition. For example, the user of the system may wish test the target website with a load equal to 1000 users on each track of a test composition. The user may indicate the number of virtual users through an input entered on a browser page of the GUI (as described below), or, alternatively, invoke a grid wizard that automatically makes an intelligent allocation of the proper amount of resources needed to conduct the test, based on examining the composition that this grid, will be running. By way of example, the system may determine that a single load server should be allocated to accommodate every 1000 virtual users.

Similarly, the system (via a grid wizard) may determine a proper allocation of result servers needed to accommodate the number of load servers specified. In one implementation, users can specify how many load servers and how many result servers they want in each cloud and region. Alternatively, users may employ the grid wizard to specify all parameters. That is, users can simply specify a defined test composition, and the grid wizard automatically, analyzes the composition and determines how many servers they need in each cloud and region. It is appreciated that the determination of the number of load servers and result servers is typically made based on considerations that ensure each virtual user has a satisfactory amount of bandwidth, CPU & memory resources, etc., such that it correctly simulates or behaves as a real-world browser.

Once the test has been defined and the parameters set (e.g., number of servers, server locations, etc.) via the grid wizard, upon user input, the user main instance 23 starts the process of actually deploying and allocating the specified resources by interacting with an application programming interface (API) of one or more cloud providers. By way of example, a user may click on a "Deploy Instances" button provided in a page of the CloudTest load testing program GUI; in response, the system software contacts all of the different cloud APIs it needs and starts to allocate the required servers.

For example, if 1000 servers are to be allocated in EC2 there may be 40 simultaneous requests issued, each request being for 25 servers. If another 200 servers need to be allocated in Microsoft Azure in two different geographically-located data centers, two simultaneous requests may be issued, each for 100 servers in each data center (due to the fact that Azure does not support allocating smaller groups into one single deployment). In other words, the user may simply click on an icon button of a GUI to initiate the deployment/allocation of resources (e.g., machine instances) needed to execute the test composition, with the requests necessary to achieve that allocation being issued/handled in an automated manner i.e., without user intervention.

FIG. 1 show the beginning of this process, wherein a first pair of load servers 21 and analytic servers 22 (also referred to as result servers or results services) have already been allocated and deployed on the grid.

Figure 2:
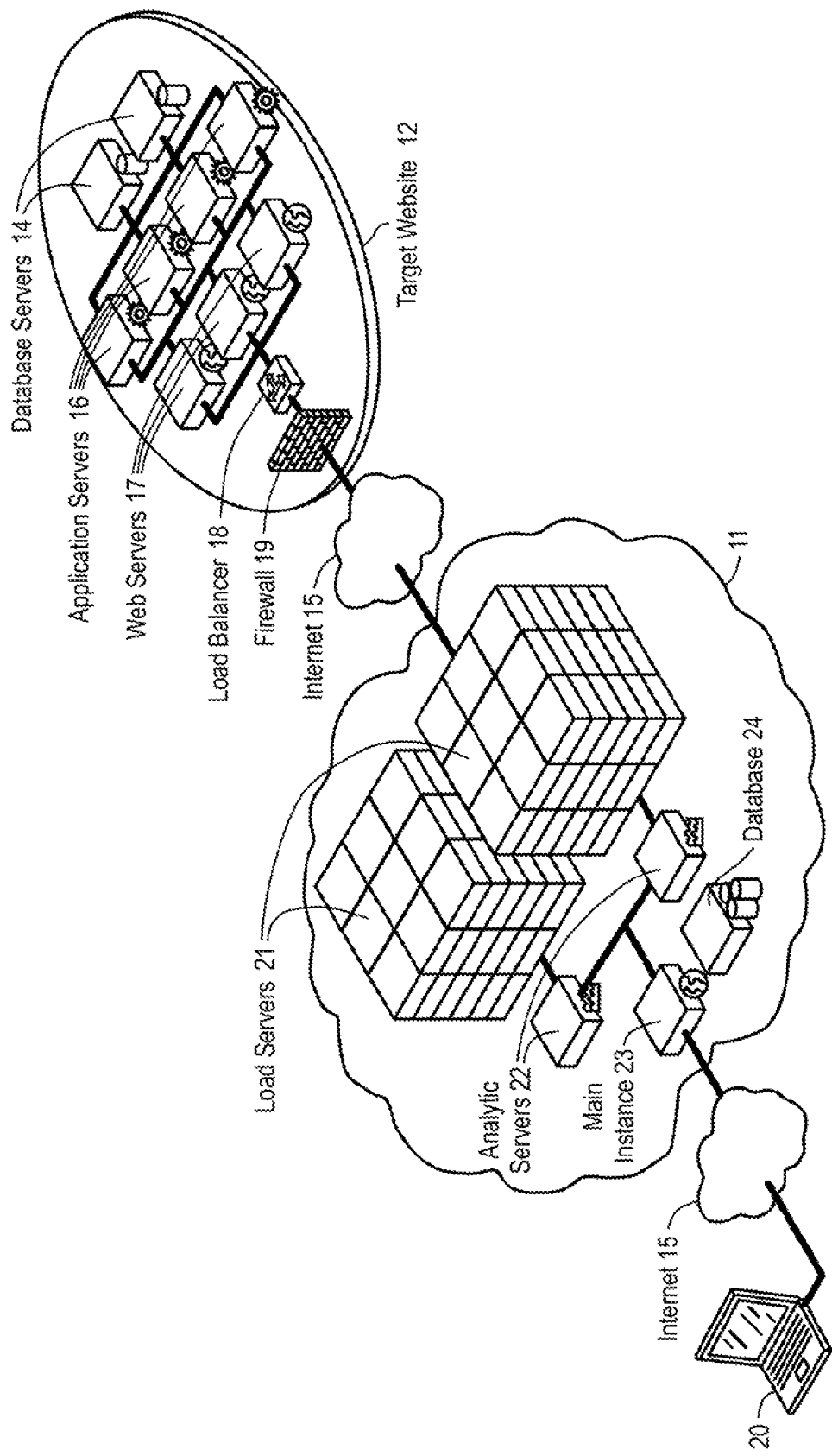
FIG. 2 illustrates an example high level architectural diagram of another stage of a CloudTest® provisioning process after the cross-cloud grid has been fully allocated and checked.

FIG. 2 illustrates an example high level architectural diagram of a later stage of a CloudTest test grid provisioning process, which may be after the cross-cloud grid has been fully allocated and checked. For reasons of clarity, an array of just fifty-four interconnected load servers 21 are shown allocated per each result server 22 in the example of FIG. 2. It is appreciated, however, that the system and method described herein is highly scalable and capable of deploying/allocating a massive amount of resources including hundreds or thousands of load servers as well as a corresponding portion or ratio of result servers, depending on the parameters specified by either the user or system prior to deployment of the grid. By way of example, a typical ratio of analytic (result) servers to load (maestro) servers is 1:50. As discussed previously, a grid—whether cross-cloud or single cloud—is a collection of load servers 21 and result servers 22, all of which (or a subset of) can be used to run a load test in concert.

Figure 3:
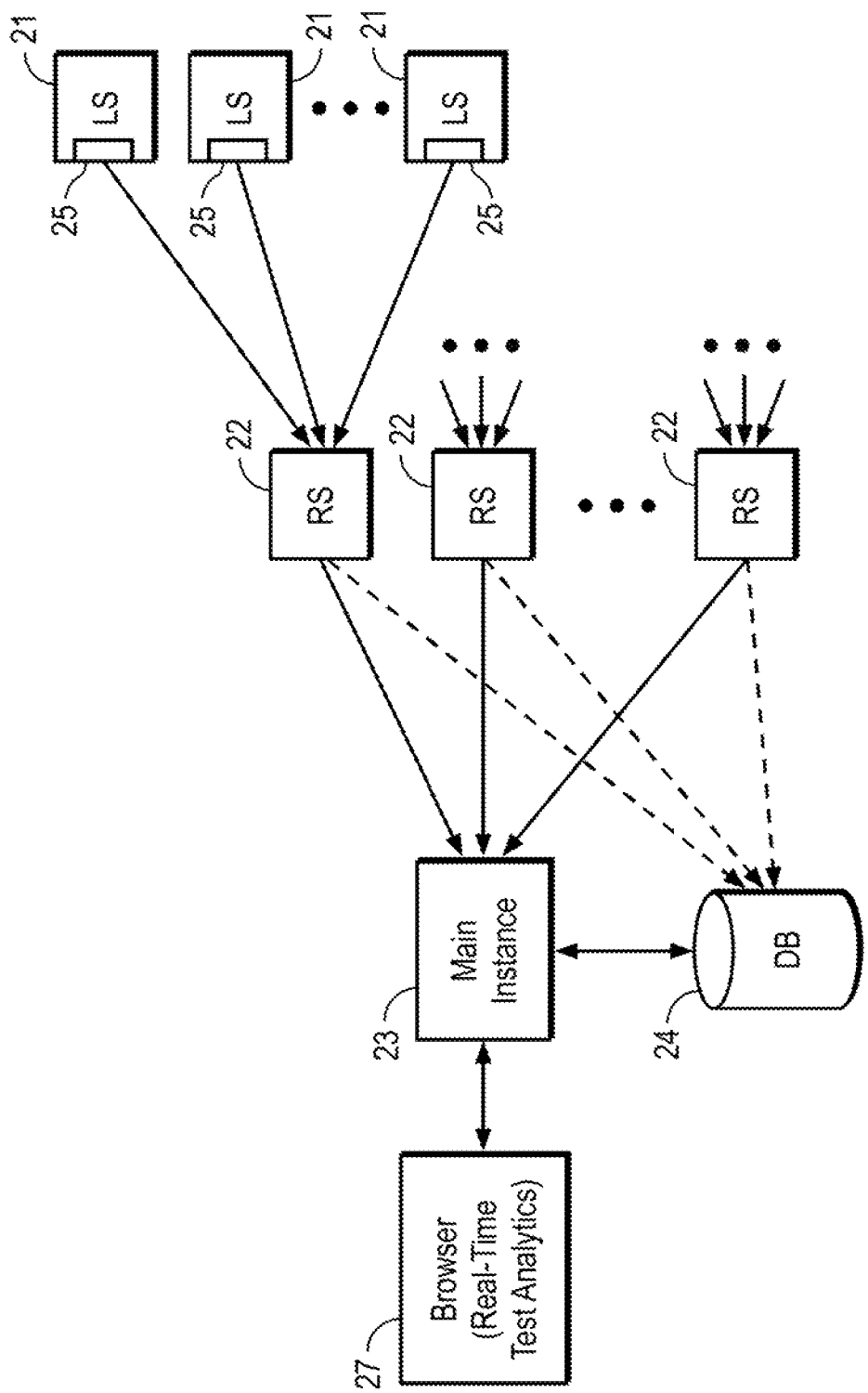
FIG. 3 is an example block high level architectural diagram that illustrates how, in real-time, load test results are aggregated at multiple different tiers or levels.

FIG. 3 is an example block high level architectural diagram that illustrates how, in real-time, load test results are aggregated at multiple different tiers or levels. As shown, block 27 represents a browser that provides real-time test analytics to a user (e.g., via laptop 20 shown in FIG. 1, or other computer device). Browser 27 is shown connected with main instance 23, which, in turn, is coupled with database 24. Database 24 provides system-level storage for aggregated test result data received from the Results Service servers 22, Database 24 receives aggregated test result data via a direct connection to each of the plurality of result servers 22.

Each of result servers 22 is connected to a plurality of associated load (Maestro) servers 21. Each load server 21 is shown having an embedded component or Result Service client 25, which computes metrics or statistics from the raw data (e.g., web pages) received from the target website or application, As discussed previously, the function of each load server 21 is to provide a load to the target website by creating one or more virtual users that access information on the target website. Within each Maestro server 21 is Result Service client 25 which functions to compute statistics such as average response time, average response size, and the like. In one embodiment, instead of sending all of the raw data, received from the target website, Result Service client 25 computes relevant statistics and discards the data. Then, once an interval (e.g., every five seconds) the statistics computed by client 25 are sent to the associated result server 22.

Each of the result servers takes all of the statistics received from all of its associated load servers 21 and further aggregates those statistics. In other words, each result server 22 aggregates the aggregated results received from all of the load servers 21 that it is connected to. The resulting aggregated data is then further aggregated when querying database 24. Thus, statistics such as average response time across all of load servers 21 for the load test is stored in database 24 and available on a real-time basis to browser 27, via database queries performed by the main instance 23, which can perform further aggregation, grouping, filtering, etc.

Practitioners in the art will appreciate that aggregating statistical results'data on multiple levels, beginning at the point closest to the actual load test results'creation, allows a user to view results in real-time on an analytic dashboard GUI, thereby permitting real-time analysis across the entire testing infrastructure.

In a specific implementation, each load server 21 includes a Result Service client 25, which in turn includes accumulators that stores the statistically aggregated data (e.g., average response time) computed on a second-by-second basis. Periodically (e.g., every 5 seconds), each Result Service client 25 sends an appropriate number of messages (e.g., 5 messages, one for each second) to its associated result server 22. That is, one batched message is sent every 5 seconds—the batched message including data about all of the previous 5 seconds. Each message contains the data metrics computed every one second interval. These fine granularity metrics are then further aggregated in database 24, It is appreciated that by computing statistics/metrics on a second-by-second basis, the analytic dashboard running on browser 27 can analyze the results on various levels of granularity. In other words, the user may want to view statistical results of the load test on a minute-by-minute basis, or all the way down to a second-by-second basis. Thus, the architecture described herein allows a user to view real-time streaming results in an analytic dashboard of various performance test metrics on a second-by-second basis, even when there are millions of virtual users on thousands of load server.

Figure 4:
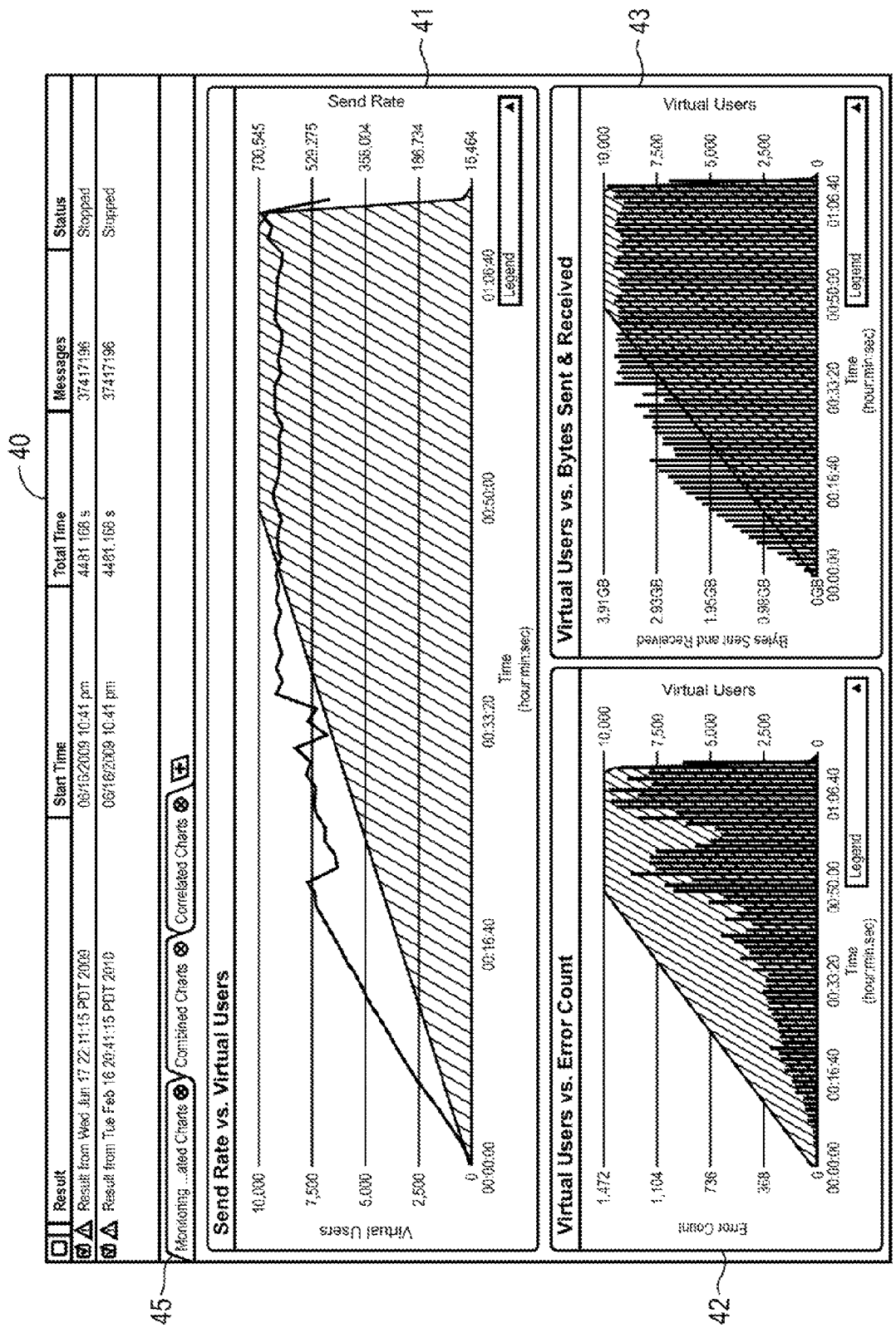
FIG. 4 illustrates an example graphical user interface window that shows real-time results of a test composition running on an example grid.

FIG. 4 illustrates an example graphical user interface window (also referred to as "widget") 40 that shows real-time results of a test composition running on an example grid . . . In other words, monitor summary widget 40 provides the user with visibility into the load that the test is creating on the grid server instances. (In the context of the present disclosure, a widget refers to a super class of charts—anything that a user might want to display graphically on a user interface. A widget can be a cross-set of results data, a set of charts, a list of data, or any combination/correlation of data displayed on the analytic dashboard.)

As shown, a set of combined charts are shown graphically in various window fields. For example, field 41 illustrates the number of virtual users (shaded area) and the send rate (heavy line) as a function of test time. As can be seen, the number of virtual users is ramped up from zero to a final total number (e.g., 10,000) over a span of time (e.g., 50minutes). The example shown in field 41 shows the load test continuing for an additional time period after the number of virtual users reaches a peak (or final) number Practitioners in the art will appreciate the usefulness of charting a test metric over time as the number of virtual users slowly ramps up. For instance, a developer or website owner can easily observe, in real-time as the load test is actively running, the aggregate performance result of the target website as the number of virtual users increases from zero users to a very large number of users over an extended time period.

Field 42 illustrates error count (vertical dark lines) and the number of virtual users (shaded area) versus test time. Field 43 shows the number of bytes sent and received (vertical dark lines) and the number of virtual users (shaded area) as a function of test time. It is appreciated that the user may select view a wide variety of charts (combined, correlated, etc.) using tabs 45. Collectively, the charts provided in window 40 allow a user to view, analyze, and monitor test results and information in real-time so as to help identify root causes of performance problems their website or web application may be experiencing.

Persons of skill in the arts will appreciate that FIG. 4 shows how the entire test grid (comprising a huge number of interconnected load and, result servers) works in concert to send load, receive responses, aggregate and analyze those responses into a real-time streaming graphical result displayed to the user. All this is accomplished regardless of how many server instances and different cloud providers are utilized to run the load test. Moreover, the various result charts may be viewed in one or many real-time streaming analytic dashboards. In each of the charts displayed on analytic dashboard window 40, the user may change the time format or legend of the horizontal axis for reporting the testing analytics in real-time on a varying time (e.g., hour-by-hour, minute-by-minute, or second-by-second) basis.

During the playback of the test composition and while the user is monitoring/viewing the test results displayed on GUI window 40, the user may pause or stop the test. Stopping the test closes the result and unloads the running test composition from all of the load servers. On the other hand, pausing or temporarily halting the test stops the load from all of the load servers, but keeps the test composition loaded and ready to resume playing into the same result. For example, the user may temporarily halt or pause the test after identifying a problem that requires adjustment of the load balancer on the target website. It should be understood that when the test is temporarily halted in this manner, the grid remains fully provisioned and running. In other words, the composition and running of the load test is independent from the provisioning and running of the grid. After any adjustments or reconfiguration of the target website, the user may continue with the execution or playback of the test composition, either beginning at the place where it as halted, or re-starting the test from the beginning. Persons of skill in the art will appreciate that the ability to start/re-start the test without affecting the state of the grid, in conjunction with the ability to view test results metrics in real-time (e.g., second-by-second) provides a powerful advantage over prior art methods for testing a customer website.

The GUI described herein also allows a user to create an active waterfall chart that functions as an analytical tool with the chart displaying results aggregated in real-time across a large number of virtual users who are continually loading one or more webpages over-and-over again. In the case of an active waterfall chart, more fine grained information is collected than just average response time, That is, test result information is collected within each resource (e.g., blocking, DNS look-up, connection, sending, waiting, receiving, etc.) In other words, the information collected is even more finely-grained than simply providing an average time it takes to load a given webpage across a given number of virtual users. For instance, an active waterfall charts may visually provide information regarding average time to load individual objects and files within the page (e.g., a specific JavaScript file) or the average DNS lookup time across all the virtual users for a specific object of a webpage. Additionally, the multi-tiered architecture described herein is advantageously utilized to produce an active waterfall chart in real-time, i.e., as the load test is running, with the information displayed changing in real-time as the test progresses (continuously in the case where the test keeps looping and loading one or more webpages over and over again).

As described above, a user or application developer viewing an active waterfall chart of one or more webpages running in a browser window may identify one or more slowest resources, pause the test, optimize the website and/or specific webpages, and restart the test to generate a new active waterfall chart following the optimization.

Figure 5:
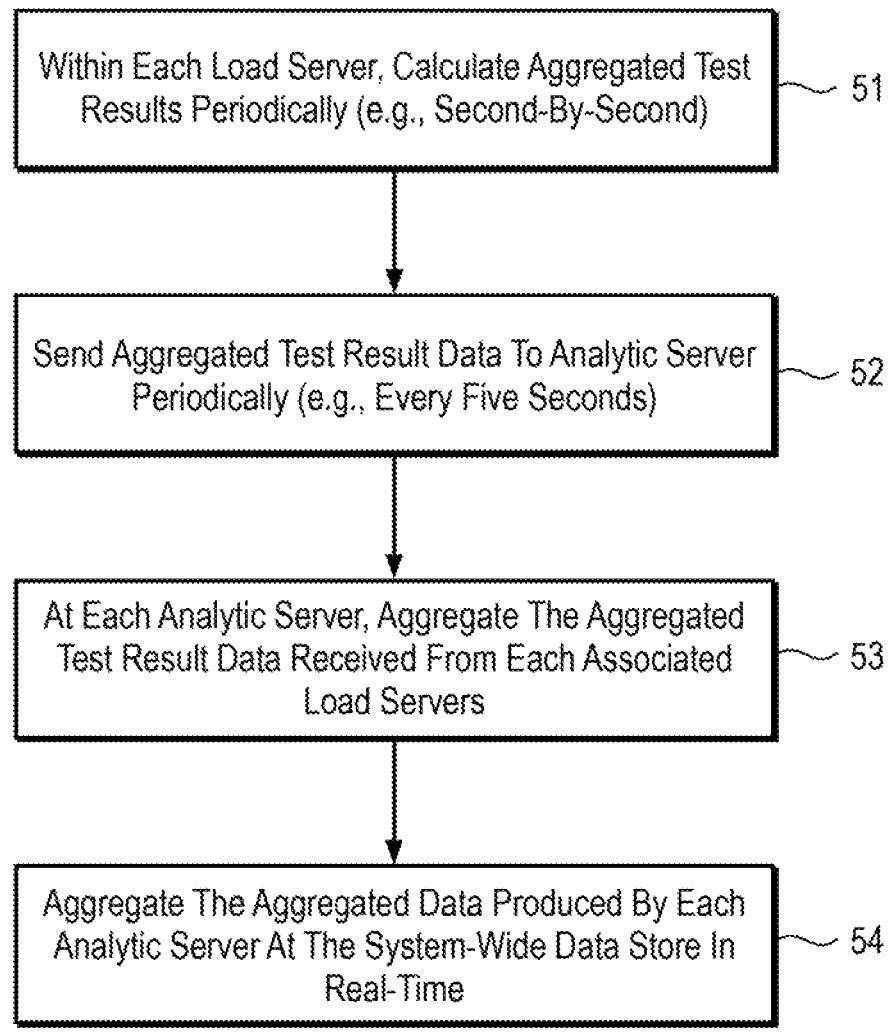
FIG. 5 is an example flow diagram of an automated sequence of steps for aggregating load test results at multiple different tiers or levels.

FIG. 5 is an example flow diagram of an automated sequence of steps for aggregating load test results at multiple different tiers or levels. This example method may be used to create any of the graphical charts, including an active waterfall chart, described herein. The example method begins at a point where the load test grid is up and running, and the test composition is being executed on the target website. As the load test progresses, within each load server, a component or client periodically calculates or computes aggregated test results from the raw load test data generated from the target website. (Block 51) The raw data may comprise HTTP, Simple Object Access Protocol (SOAP) or other protocols messages' responses received from the target website, whereas the aggregated test results may comprise any statistic or metric of interest. The periodic interval that the aggregated test results are computed for may vary. For example, results may be computed every second.

The aggregated test results computed by the client running on each load server are periodically sent to their associated analytic server. (Block 52) The period at which the aggregated results are sent to the analytic servers may be equal to or greater than the period at which the aggregated test results are computed within each load server. In a typical implementation, aggregated test result data is computed by each load server every second, with the results of those computations being sent to the analytic servers from each of the load servers every five seconds.

Next, at each analytic server the aggregated test result data received from each of the associated load servers is further aggregated. In other words, each analytic server produces aggregated test result data across all of its associated load servers. (Block 53) For example, if each analytic server is associated (i.e., connected) with fifty load servers, each analytic server aggregates statistics/metrics across the aggregated test result data received from each of the fifty load servers.

Finally, at block 54, the aggregated data;produced by each analytic server is further aggregated at the system-wide data store in real-time. For instance, Structured Query Language (SQL) queries to the database can perform aggregation functions (e.g., AVG, SUM, etc.) against tables' rows that have been inserted from the individual analytics servers, thereby producing further (third-level) aggregated results.

As explained above, the results of this final level of aggregation are available in real-time to a browser executing an analytic dashboard that provides a graphical display of the multiple results in various charts. The results are maintained in the dashboard in real time, since the browser; continues to produce the latest changes in each result set by querying the database for all of the rows that have changed since the last time that the queries ran.

A "delta-change" document containing updated data and statistics may be produced and sent to the browser, which merges the changes into the currently displayed chart. In one embodiment, if the multi-result chart is combined or correlated the dashboard may produce more than one delta-change document and merge all of the different changes into the multi-result chart. If the multi-result chart is correlated, the widget code may wait or pause until both data points (from each result set) available for a given point in time. In other words, a new point is shown in the statistical correlation chart once the data is available for each result set.

Figure 6:
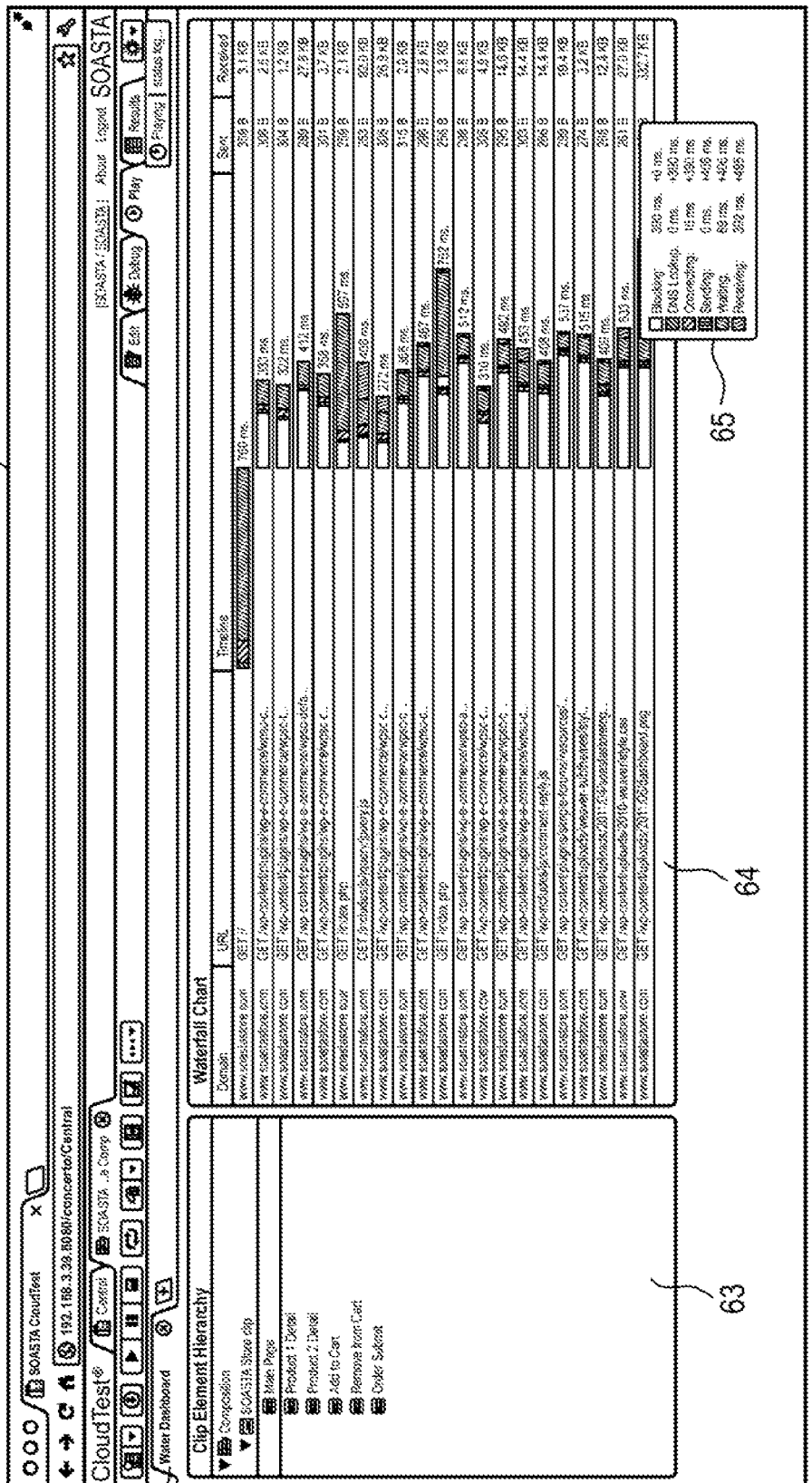
FIG. 6 is an example graphical user interface window that illustrates an active waterfall chart showing aggregated results for a plurality of virtual users at a first point in time during execution of a load test.

FIG. 6 is an example graphical user interface window 61 that illustrates an active waterfall chart showing aggregated results for a plurality of virtual users at a first point in time during execution of a load test. Note that GUI window 61 shows a "Play" tab of a CloudTest platform selected, which runs or plays a test composition that results in active waterfall chart 64 being generated on dashboard 62. Clip Element Hierarchy area 63 shows that the Main Page of a SOASTA™ Store Clip test composition has been selected. This test composition runs one or more webpages of the domain www.soastastore.com as indicated under the "Domain" heading on the far left-hand side of active waterfall chart 64.

As shown, each line or row of the waterfall chart illustrates a horizontal timeline associated with each "GET" of an object, file, or resource identified under the Uniform Resource Locator (URL) heading, The timeline associated with each row of active waterfall chart advances from left-to-right in real-time as the test composition progresses and/or loops. As can be seen, each timeline consists of a series or sequence of horizontal bars that are shaded so as to indicate the various operations or functions performed. For instance, in the implementation shown, positioning the cursor over one of the timelines produces a key 65 that shows the constituents or components of the timeline along with the associated total time aggregated for all of the virtual users currently participating in the load test. For example, key 65 illustrates component times for Blocking, DNS Lookup, Connecting, Sending, Waiting, and Receiving for the selected object, file, or resource. The far right-hand column of key 65 also lists the cumulative time (again aggregated over the total virtual users) currently expended to GET that particular object, file, or resource. Note that the example snapshot of GUI window 61 shown in FIG. 6 is taken 760 milliseconds after commencing the load test.

Figure 7:
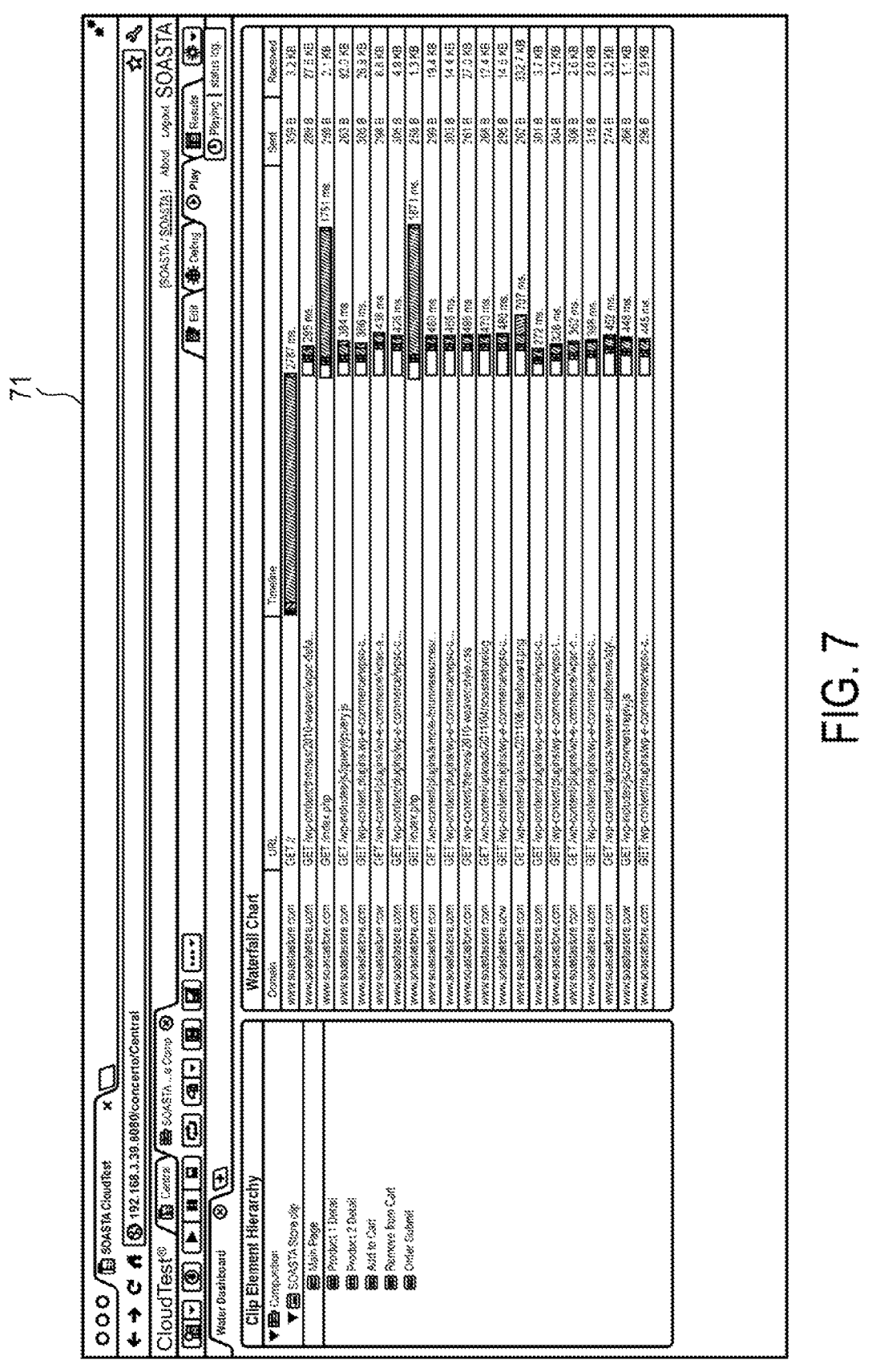

FIG. 7 is an example GUI window 71 that illustrates an active waterfall chart showing aggregated results for a plurality of virtual users running the same test composition on the same target website/webpage(s) as previously shown in FIG. 6, but at a second point in time during execution of the load test. As shown, the example GUI window 71 is a snapshot taken 2787 milliseconds after the start of the load test. Similarly, FIG. 8 is an example GUI window 81 that illustrates an active waterfall chart for the same load test/target website/webpage(s) as previously shown in FIGS. 6 & 7, but at a third point in time, i.e., at 4147 milliseconds.

Figure 8:
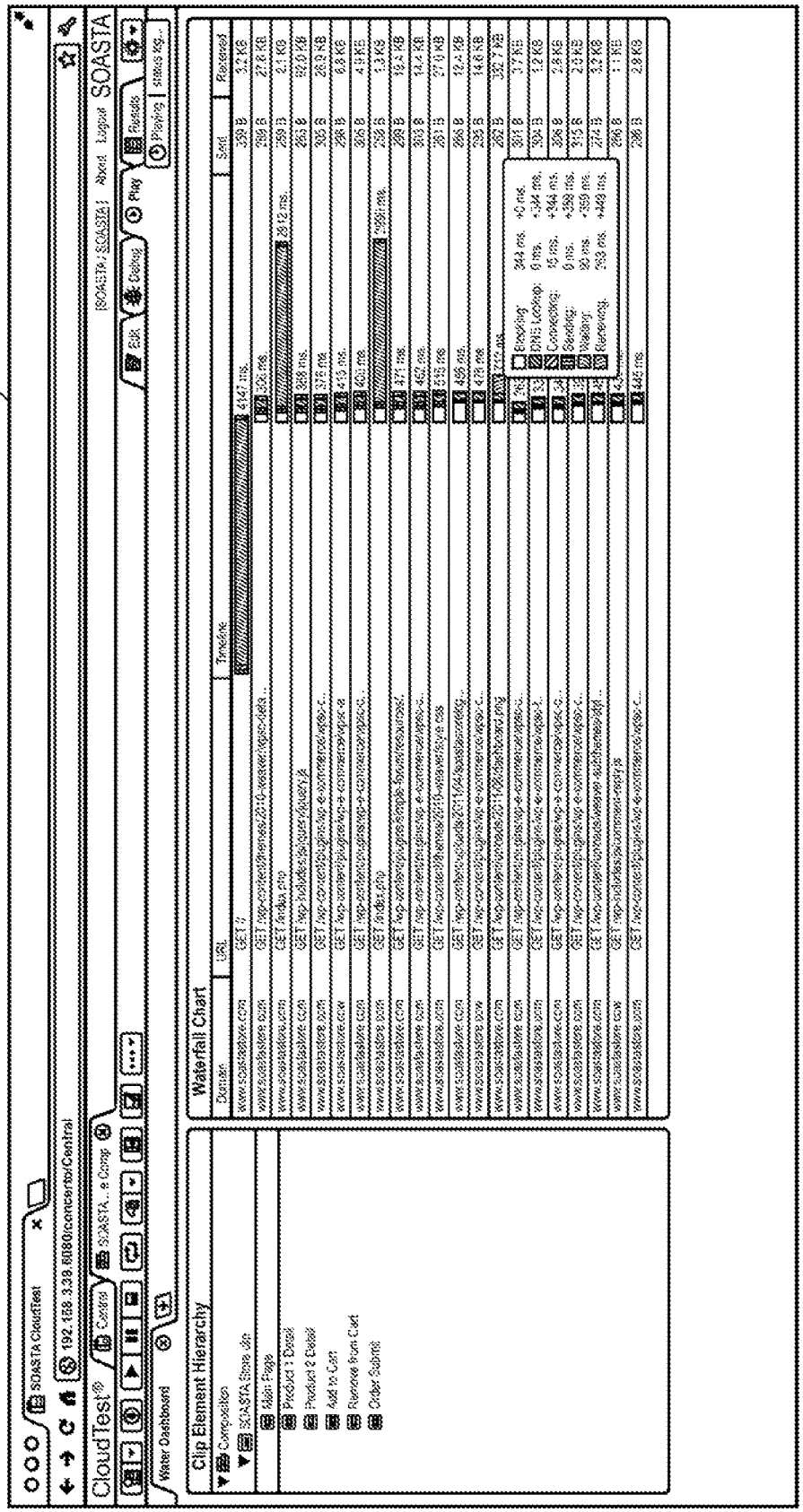
FIG. 8 is an example graphical user interface window that illustrates an active waterfall chart showing aggregated results for a plurality of virtual users at a third point in time during execution of a load test.

Persons of ordinary skill will appreciate that the information provided in the active waterfall chart illustrated in the example GUI window snapshots of FIGS. 6-8 changes in real-time as the load test runs. That is, to a user viewing the waterfall dashboard on a display screen, the various timeline bars would appear to advance horizontally and change in real-time as the test progresses and/or loops. Persons of skill will further appreciate that the number of virtual users participating in the load test may range anywhere from a very few (e.g., tens) to a very large number (e,g., tens of millions). A typical load test ordinarily is designed to ramp up from zero users to a final total number of users (e.g., a million) over a certain period of time (e.g., 1-2 hours). Thus, the active waterfall chart generated on the user's analytic dashboard allows the user to visually see exactly how the target website/webpage(s) perform during the ramp up period of the test composition where the number of virtual users slowly increases. The achievement of an active waterfall chart that provides aggregated results across all of the virtual users in a real-time analytic dashboard provides a user with a powerful ad hoc analytical/investigative tool to better understand the performance of a target website.

Figure 9:
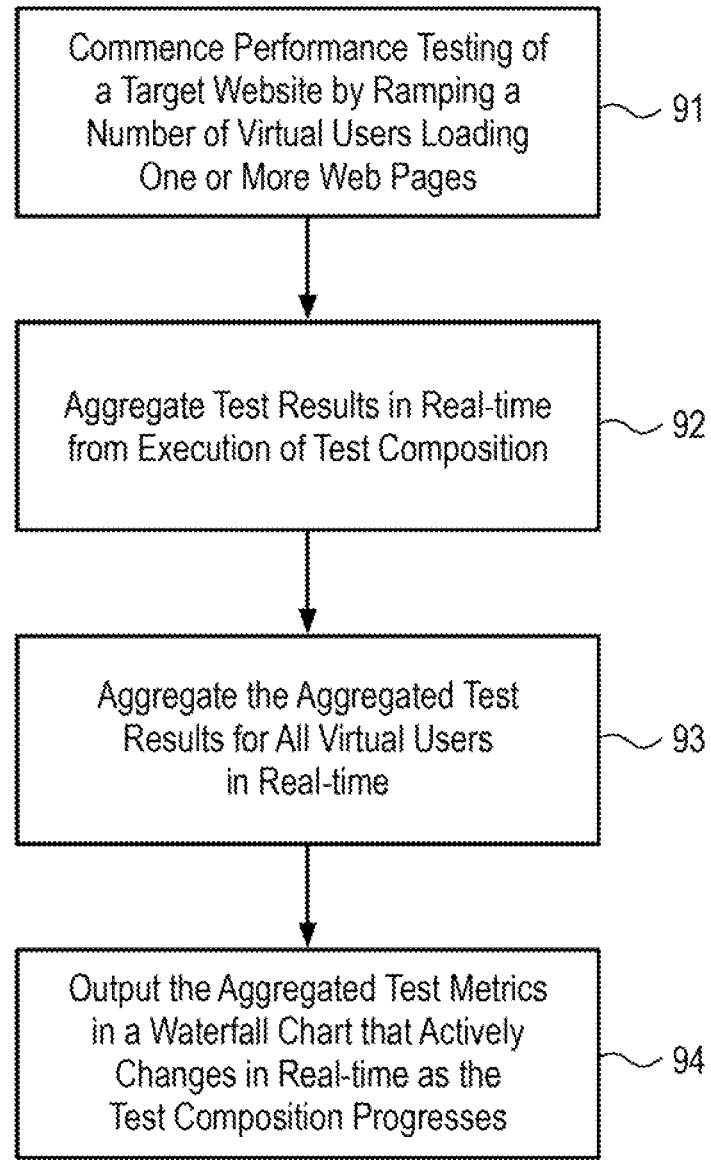
FIG. 9 is an example flow diagram of a sequence of steps for producing an active waterfall chart with aggregated test metrics in real-time.

FIG. 9 is an example flow diagram of a sequence of steps for producing an active waterfall chart with aggregated test metrics in real-time. The example method begins at block 91 where the performance or load test of the target website begins ramping up the number of virtual users from zero to some final number. Each of the virtual users is implemented by a load server that executes a test composition on the target website. In the case of an active waterfall chart, each virtual user is loading one or more webpages into a virtual web browser, which involves loading all of the various resources (e.g., objects, files, etc.) associated with the webpage(s). Each load server includes a component or client that periodically calculates or computes aggregated test results in real-time from the raw load test data generated from execution of the test the target website. (Block 92) For example, the aggregated test results may comprise information collected and statistics (e.g., averages across all virtual users associated with a particular load server) generated about each resource. This information may include Blocking, DNS look-up, connecting, sending, waiting, and receiving times.

Next, the aggregated test results computed by the client running on each load server are periodically sent to a tier of associated analytic or results servers. There, at each analytic server the aggregated test result data received from each of the associated load servers is further aggregated to produce aggregated test metrics for all the virtual users in real-time. (Block 93) In one implementation, aggregated test result data is computed by each load server every second, with the results of those computations being sent to the analytic servers from each of the load servers every 2-5 seconds.

The aggregated results across all of the virtual users may be output in real-time to a browser providing an analytic dashboard that provides a GUI that outputs aggregated results streaming in real-time of the load test performed on a target website. An active waterfall chart is produced (i.e., displayed) on the analytic dashboard that includes a plurality of timeline bars, each of the timeline bars representing an aggregated result for a resource of the one or more webpages across all of the virtual users. The timeline bars change in real-time as the load test progresses. For instance, the timeline bars typically advance horizontally from left to right as the test time increases and the number of virtual users ramps up. Each of the timeline bars consists of a plurality of timeline activities (e.g., Blocking, DNS look-up, connecting, sending, waiting and receiving times).

The aggregated test results are maintained in the dashboard in real time, since the browser continues to produce the latest changes in the multiple rows of horizontal timeline bars displayed in the active waterfall chart. That is, to a user viewing the active waterfall chart each of the horizontal timeline bars appear to move and change continuously in real-time in accordance with the aggregated information about the associated webpage resource as the load test continues to run. (Block 94)

It should be understood that elements of the disclosed subject matter may also be provided as, computer program product which may include a machine-readable medium having stored thereon instructions or code which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, or other type of machine-readable medium suitable for storing electronic instructions.

Additionally, although the present invention has been described in conjunction with specific embodiments, numerous modifications and alterations are well within the scope of the present invention. Accordingly, the specification and drawings are to be regarded in an illustrative rather than a restrictive sense.

We claim:

1. A system comprising:
a plurality of load servers that execute a load test on one or more webpages of a website, each load server including a processor coupled with a memory for executing the load test, the load test comprising a plurality of virtual users simulated by the load servers, each of the load servers being operable to compute aggregated results including statistics in real-time as the load test executes, the statistics including an average response time, the aggregated results being computed at periodic intervals and streamed in real-time;
one or more analytic servers configured to receive the aggregated results streamed from the load servers, each analytic server including a processor coupled with a memory, the one or more analytic servers being at a different architectural level than the load servers and configured to produce aggregated test metrics in real-time as the load test executes from the aggregated results for all of the virtual users;
a graphical user interface (GUI) that allows a user to display an active waterfall chart on an analytic dashboard, the active waterfall chart displaying information for a series of actions that occur when a virtual user accesses a particular webpage, the displayed information including a sequence of timeline bars, each of the timeline bars being displayed on a separate row of the active waterfall chart and representing an aggregated test metric result for an action taken to get an object, file, or resource of the particular webpage across all of the virtual users.

2. The system of claim 1 wherein the actions include a Domain Name System (DNS) lookup time.

3. The system of claim 1 wherein actions include a Transmission Control Protocol (TCP) connection time.

4. The system of claim 1 wherein the actions include a Transmission Control Protocol (TCP) connection time.

5. The system of claim 1 wherein a number of the virtual users changes over a time period of the test composition.

6. The system of claim 1 wherein the timeline bars change in real-time across a changing number of virtual users as the load test progresses.

7. The system of claim 1 wherein the eline bars change in real-time across multiple webpages associated with a target website as the load test progresses.

8. The system of claim 1 wherein each load server include embedded component configured to compute the aggregated results at the periodic intervals.

9. The system of claim 1 further comprising a data store that aggregates the aggregated test metrics received from the one or more analytic servers, the GUI querying the data store in real-time to produce each of the timeline bars displayed on the analytic dashboard.

\* \* \* \* \*